(12) United States Patent
Miyazaki et al.

(10) Patent No.: US 7,585,560 B2
(45) Date of Patent: Sep. 8, 2009

(54) OPTICAL LAMINATE

(75) Inventors: Hidetake Miyazaki, Tokyo-To (JP); Tomoyuki Maekawa, Tokyo-To (JP); Gen Furui, Tokyo-To (JP)

(73) Assignee: Dai Nippon Printing Co., Ltd., Shinjuku-ku (JP)

( * ) Notice: Subject to any disclaimer, the term of this patent is extended or adjusted under 35 U.S.C. 154(b) by 12 days.

(21) Appl. No.: 11/226,077

(22) Filed: Sep. 14, 2005

(65) Prior Publication Data

US 2006/0134428 A1 Jun. 22, 2006

(30) Foreign Application Priority Data

Sep. 30, 2004 (JP) .............................. 2004-287574

(51) Int. Cl.
*B32B 5/16* (2006.01)
*B32B 27/32* (2006.01)

(52) U.S. Cl. ..................... 428/323; 428/220; 428/327; 428/332

(58) Field of Classification Search ...................... None
See application file for complete search history.

(56) References Cited

U.S. PATENT DOCUMENTS 5,612,099 A * 3/1997 Thaler ........................ 427/565
6,800,378 B2 * 10/2004 Hawa et al. ................. 428/688

* cited by examiner

*Primary Examiner*—Sheeba Ahmed
(74) *Attorney, Agent, or Firm*—Burr & Brown

(57) ABSTRACT

The present invention discloses an optical laminate that exhibits optical properties such as reflection prevention and interference fringe prevention. The optical laminate comprises: a light transparent base material; and an anti-dazzling layer provided on the light transparent base material, wherein the anti-dazzling layer having been formed by applying a composition for an anti-dazzling layer onto the light transparent base material, and a penetrable solvent and a resin contained in the composition for an anti-dazzling layer penetrate into the light transparent base material so that the resin and the light transparent base material perfectly uniformly blended together to form a penetrating layer.

14 Claims, 1 Drawing Sheet

OPTICAL LAMINATE

RELATED APPLICATION

This application is a patent application claiming priority based on Japanese Patent Application No. 287574/2004, the whole of which is incorporated herein.

TECHNICAL FIELD

The present invention relates to an optical laminate and particularly to an antireflective laminate.

BACKGROUND ART

Image display surfaces in image display devices such as liquid crystal displays (LCDs) or cathode ray tube display devices (CRTs) are required to reduce the reflection of light emitted from an external light source such as a fluorescent lamp and thus to enhance the visibility of the image. To meet this demand, an optical laminate (for example, an antireflective laminate) comprising a transparent object and a transparent film having a low refractive index covering the surface of the transparent object for lowering the reflectance has been provided to reduce the reflection from the display surface of the image display device and thus to improve the visibility. An example of the antireflective laminate comprises a light transparent base material and an anti-dazzling layer and a refractive index layer stacked on the surface of the light transparent base material.

In the conventional optical laminate, desired optical properties have been provided by selecting, for example, proper properties and addition amount of additives (electrically conductive particles and anti-dazzling agents) in each layer. For example, Japanese Patent Laid-Open No. 75605/2003 proposes that, for example, for refractive index of the transparent resin used in an anti-dazzling layer, particle diameter, and incorporation of particles, proper values are selected to improve the optical properties of the anti-dazzling laminate.

So far as the present inventors know, however, up to now, there is no report about that an optical laminate of high-definition specifications has been developed by aiming at correlation between individual layers in the optical laminate and regulating correlation between the layers to improve the optical properties of the optical laminate per se.

DISCLOSURE OF THE INVENTION

At the time of this invention, the present inventors have aimed at the interface between the light transparent base material and the anti-dazzling layer and have found that excellent optical properties can be imparted by penetration of a penetrable solvent and a resin added to a composition for an anti-dazzling layer into the light transparent base material to form a penetrating layer. The present invention has been made based on such finding.

Thus, according to the present invention, there is provided an optical laminate comprising: a light transparent base material; and an anti-dazzling layer provided on said light transparent base material, wherein said anti-dazzling layer having been formed by applying a composition for an anti-dazzling layer onto said light transparent base material, and a penetrable solvent and a resin contained in said composition for an anti-dazzling layer penetrate into said light transparent base material so that the resin and the light transparent base material are perfectly uniformly blended together to form a penetrating layer.

An optical laminate according to another preferred embodiment of the present invention comprises: a light transparent base material; and an antistatic layer and an anti-dazzling layer provided in that order on the light transparent base material, wherein said anti-dazzling layer has been formed by applying a composition for an anti-dazzling layer onto said antistatic layer, and a penetrable solvent and a resin contained in said composition for an anti-dazzling layer penetrate into said light transparent base material so that the resin and the light transparent base material are perfectly uniformly blended together to form a penetrating layer.

An optical laminate according to still another preferred embodiment of the present invention comprises: a light transparent base material; and a hardcoat layer and an anti-dazzling layer provided in that order on the light transparent base material, wherein said anti-dazzling layer has been formed by applying a composition for an anti-dazzling layer onto said hardcoat layer, and a penetrable solvent and a resin contained in said composition for an anti-dazzling layer penetrate into said light transparent base material so that the resin with and light transparent base material are perfectly uniformly blended together to form a penetrating layer.

By virtue of the formation of a penetrating layer, the optical laminate according to the present invention can exhibit optical properties such as prevention of reflection of fluorescent light or the like from the display screen and the prevention of scintillation. Further, regarding concaves and convexes formed on the outermost surface of the anti-dazzling layer, concaves and convexes having a desired shape can be advantageously formed without the deposition of a large amount of the resin component onto the anti-dazzling agent. In the present invention, "scintillation" refers to dazzling light which, when light transmitted from within a display reaches the observer's eyes from the display surface, occurs due to the concave and convex shapes and hinders visibility.

BEST MODE FOR CARRYING OUT THE INVENTION

1. Optical Laminate

Figure 1:
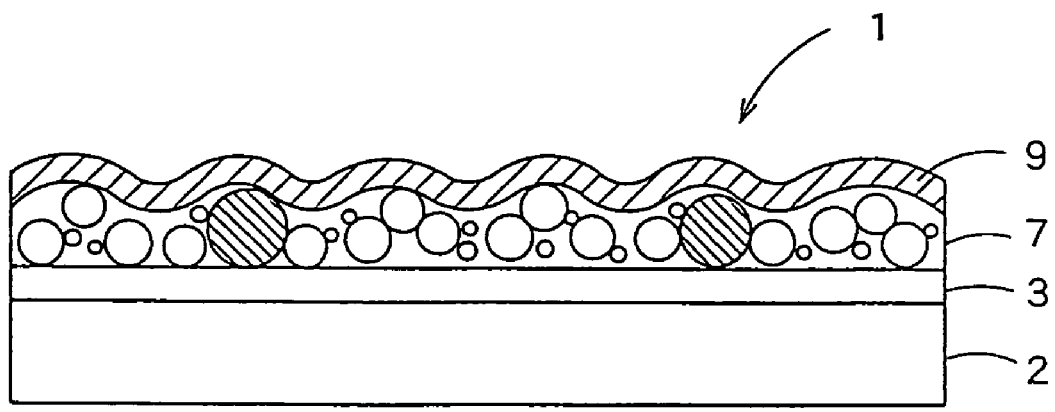
FIG. 1 is a cross-sectional view of an optical laminate according to the present invention.

The optical laminate according to the present invention will be described in conjunction with FIG. 1. FIG. 1 is a schematic diagram of an optical laminate 1. An optical laminate 1 (an antireflective laminate) includes a light transparent base material 2. An anti-dazzling layer 7 and a lower-refractive index layer 9 are provided on the upper surface of the light transparent base material 2. When the composition for an anti-dazzling layer is coated onto the light transparent base material 2, a penetrable solvent and a resin contained in the composition for an anti-dazzling layer penetrate from the outermost surface of the light transparent base material 2 so that the resin contained in the composition for an anti-dazzling layer and the light transparent base material are perfectly uniformly blended together to form a penetrating layer 3. The formation of the penetrating layer 3 can realize excellent optical properties of the optical laminate according to the present invention. In order to facilitate the understanding of the penetrating layer 3, FIG. 1 is shown so that the penetrating layer 3 exists between the anti-dazzling layer 7 and the light transparent base material 2. In the present invention, however, these three layers are formed so that any interface does not substantially exist, and, hence, such laminate is preferred.

Figure 2:
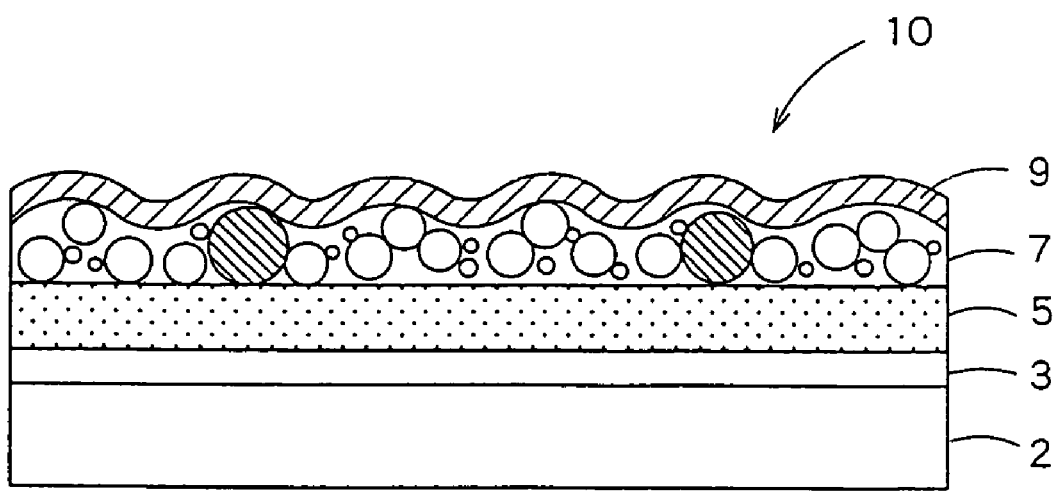
FIG. 2 is a cross-sectional view of a preferred optical laminate of the present invention.

A preferred optical laminate according to the present invention will be described in conjunction with FIG. 2. FIG. 2 is a schematic diagram of an optical laminate 10 (an antireflective laminate). This optical laminate 10 has the same construction as shown in FIG. 1, except that an antistatic layer 5 or a hardcoat layer 5 is stacked between the light transparent base material 2 and the anti-dazzling layer 7 in the optical laminate 1 shown in FIG. 1. When the composition for an anti-dazzling layer is coated onto the antistatic layer 5 or the hardcoat layer 5, a penetrable solvent and a resin contained in the composition for an anti-dazzling layer are passed through the antistatic layer 5 or the hardcoat layer 5 and penetrate from the outermost surface of the light transparent base material 2, so that the resin contained in the composition for an anti-dazzling layer and the light transparent base material are perfectly uniformly blended together to form a penetrating layer 3. In order to facilitate the understanding of the penetrating layer 3, FIG. 2 is shown so that the penetrating layer 3 exists between the antistatic layer 5 or the hardcoat layer 5 and the light transparent base material 2. In the present invention, these three layers are formed so that any interface does not substantially exist, and, hence, such laminate is preferred.

In a more preferred embodiment of the present invention, in the optical laminate 10 shown in FIG. 2, the antistatic layer 5 or the hardcoat layer 5 is formed by applying a composition for an antistatic layer or a composition for a hardcoat layer onto the light transparent base material 2. Here there is proposed an optical laminate comprising an anti-dazzling layer 7 formed by applying a composition for an anti-dazzling layer onto an antistatic layer 5 or a hardcoat layer 5, wherein a penetrable solvent and a resin contained in the composition for an antistatic layer or the composition for a hardcoat layer, a penetrable solvent and a resin contained in the composition for an ant-dazzling layer penetrate into a light transparent base material 2 so that the resin contained in the composition for an antistatic layer or the composition for a hardcoat layer, the resin contained in the composition for an anti-dazzling layer and the light transparent base material are perfectly uniformly blended together to form a penetrating layer 3.

In the optical laminate according to the present invention, it is preferred that any penetrable solvent does not stay in the penetrating layer 3 in the optical laminate as the final product.

1) Penetrating Layer

The presence of the penetrating layer can substantially eliminate the interface between the light transparent base material and each layer such as the anti-dazzling layer (and further the antistatic layer and the hardcoat layer) and thus can prevent the occurrence of interference fringes to impart excellent optical properties. Further, the resin component of the anti-dazzling layer can be regulated, and, consequently, the outermost surface of the anti-dazzling layer can be formed so as to have a desired concave-convex shape.

In the present invention, the thickness of the penetrating layer is not less than 0.1 µm and not more than 1.5 µm. Preferably, the lower limit of the thickness of the penetrating layer is 0.3 µm, and the upper limit is 0.9 µm. More preferably, the lower limit of the thickness of the penetrating layer is 0.5 µm, and the upper limit is 0.7 µm. The thickness of the penetrating layer may be properly regulated by varying the addition amount of the penetrable solvent which will be described later.

2) Anti-dazzling Layer

The anti-dazzling layer may be formed of a penetrable solvent, a resin, and an anti-dazzling agent. The thickness of the anti-dazzling layer is in the range of 0.1 to 100 µm, preferably 0.8 to 20 µm. When the layer thickness is in the above-defined range, the function as the anti-dazzling layer can be satisfactorily developed.

1) Penetrable Solvent

In the present invention, the penetrable solvent refers to a solvent that has any action of penetrating properties, swelling properties, and penetration dissolving properties and the like.

Specific examples of penetrable solvents include acetone, ketone, methyl ethyl ketone, cyclohexanone, tetrahydrofuran, nitromethane, 1,4-dioxane, dioxolane, N-methylpyrrolidone, ethyl acetate, methyl acetate, butyl acetate, dichloromethane, trichloromethane, trichloroethylene, ethylene chloride, trichloroethane, tetrachloroethane, N,N-dimethylformamide, and chloroform. The penetrable solvent is preferably one solvent or a mixture of two or more solvents selected from the group consisting of methyl ethyl ketone, cyclohexanone, tetrahydrofuran, ethyl acetate, methyl acetate, dichloromethane, and chloroform.

2) Resin

Specific examples of resins usable herein include thermoplastic resins, heat curing resins, or ionizing radiation curing resins or ionizing radiation curing compounds (including organic reactive silicon compounds). Thermoplastic resins may be used as the resin. More preferably, heat curing resins are used. Most preferred are ionizing radiation curing resins or ionizing radiation curing compound-containing ionizing radiation curing compositions.

The ionizing radiation curing composition is a composition prepared by properly mixing a prepolymer, oligomer and/or monomer containing a polymerizable unsaturated bond or epoxy group in its molecule together. The ionizing radiation refers to a radiation having an energy quantum which can polymerize or crosslink the molecule among electromagnetic waves or charged particle beams and is generally ultraviolet light or electron beams.

Examples of prepolymers and oligomers in the ionizing radiation curing composition include unsaturated polyesters such as condensates of unsaturated dicarboxylic acids and polyhydric alcohols, methacrylates such as polyester methacrylate, polyether methacrylate, polyol methacrylate, and melamine methacrylate, acrylates such as polyester acrylate, epoxy acrylate, urethane acrylate, polyether acrylate, polyol acrylate, and melamine acrylate, and cation polymerizable epoxy compounds.

Examples of monomers in the ionizing radiation curing composition include styrene monomers such as styrene and α-methyl styrene, acrylic esters such as methyl acrylate, 2-ethylhexyl acrylate, methoxyethyl acrylate, butoxyethyl acrylate, butyl acrylate, methoxybutyl acrylate, and phenylacrylate, methacrylic esters such as methyl methacrylate, ethyl methacrylate, propyl methacrylate, methoxyethyl methacrylate, ethoxymethyl methacrylate, phenyl methacrylate, and lauryl methacrylate, unsaturated substituted amino alcohol esters such as 2-(N,N-diethylamino)ethyl acrylate, 2-(N,N-dimethylamino)ethyl acrylate, 2-(N,N-dibenzylamino)methyl acrylate, and 2-(N,N-diethylamino)propyl acrylate, unsaturated carboxylic acid amides such as acrylamide and methacrylamide, compounds such as ethylene glycol diacrylate, propylene glycol diacrylate, neopentyl glycol diacrylate, 1,6-hexanediol diacrylate, and triethylene glycol diacrylate, polyfunctional compounds such as dipropylene glycol diacrylate, ethylene glycol diacrylate, propylene glycol dimethacrylate, and diethylene glycol dimethacrylate, and/or polythiol compounds containing two or more thiol groups in the molecule thereof, for example, trimethylolpropane trithioglycolate, trimethylolpropane trithiopropylate, and pentaerythritol tetrathioglycolate.

In general, if necessary, one or a mixture of at least two of the compounds described above is used as the monomer in the ionizing radiation curing composition. In order to impart ordinary coatability to the ionizing radiation curing composition, preferably, the content of the prepolymer or oligomer is brought to not less than 5% by weight, and the content of the monomer and/or polythiol compound is brought to not more than 95% by weight.

When flexibility is required of a film formed by coating the ionizing radiation curing composition and curing the coating, this requirement can be met by reducing the amount of the monomer or using an acrylate monomer having one or two functional groups. When abrasion resistance, heat resistance, and solvent resistance are required of a film formed by coating the ionizing radiation curing composition and curing the coating, this requirement can be met by tailoring the design of the ionizing radiation curing composition, for example, by using an acrylate monomer having three or more functional groups. Monofunctional acrylate monomers include 2-hydroxy acrylate, 2-hexyl acrylate, and phenoxyethyl acrylate. Difunctional acrylate monomers include ethylene glycol diacrylate and 1,6-hexanediol diacrylate. Tri- or higher functional acrylate monomers include trimethylolpropane triacrylate, pentaerythritol triacrylate, pentaerythritol tetraacrylate, and dipentaerythritol hexaacrylate.

In order to regulate properties such as flexibility or surface hardness of a film formed by coating the ionizing radiation curing composition and curing the coating, a resin not curable by ionizing radiation irradiation may also be added to the ionizing radiation curing composition. Specific examples of resins usable herein include thermoplastic resins such as polyurethane resins, cellulosic resins, polyvinyl butyral resins, polyester resins, acrylic resins, polyvinylchloride resins, and polyvinyl acetate. Among them, polyurethane resins, cellulosic resins, polyvinyl butyral resins and the like are preferably added from the viewpoint of improving the flexibility.

When curing after coating of the ionizing radiation curing composition is carried out by ultraviolet light irradiation, photopolymerization initiators or photopolymerization accelerators are added. In the case of radically polymerizable unsaturated group-containing resins, photopolymerization initiators usable herein include acetophenones, benzophenones, thioxanthones, benzoins, and benzoin methyl ethers. They may be used either solely or as a mixture of two or more. In the case of cationically polymerizable functional group-containing resins, photopolymerization initiators usable herein include aromatic diazonium salts, aromatic sulfonium salts, aromatic iodonium salts, metallocene compounds, benzoin sulfonates and the like. They may be used either solely or as a mixture of two or more. The amount of the photopolymerization initiator added is 0.1 to 10 parts by weight based on 100 parts by weight of the ionizing radiation curing composition.

The ionizing radiation curing composition may be used in combination with the following organic reactive silicon compound.

One of organic silicon compounds usable herein is represented by general formula $R_mSi(OR')_n$ wherein R and R' represent an alkyl group having 1 to 10 carbon atoms; and m as a subscript of R and n as a subscript of OR' each are an integer satisfying a relationship represented by m+n=4.

Specific examples thereof include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

Organic silicon compounds usable in combination with the ionizing radiation curing composition are silane coupling agents. Specific examples thereof include γ-(2-aminoethyl) aminopropyltrimethoxysilane, γ-(2-aminoethyl) aminopropylmethyldimethoxysilane, β-(3,4-epoxycyclohexyl) ethyltrimethoxysilane, γ-aminopropyltriethoxysilane, γ-methacryloxypropylmethoxysilane, N-β-(N-vinylbenzylaminoethyl)-γ-aminopropylmethoxysilane hydrochloride, γ-glycidoxypropyltrimethoxysilane, aminosilane, methylmethoxysilane, vinyltriacetoxysilane, γ-mercaptopropyltrimethoxysilane, γ-chloropropyltrimethoxysilane, hexamethyldisilazane, vinyl-tris(β-methoxyethoxy) silane, octadecyidimethyl [3-(trimethoxysilyl) propyl] ammonium chloride, methyltrichlorosilane, and dimethyldichlorosilane.

Anti-dazzling Agent

The anti-dazzling agent may be of any of inorganic and organic types. The form of the anti-dazzling agent may be any one, and examples thereof include fine particles. Among the fine particles, resin beads are preferred. Preferably, the refractive index is in the range of 1.40 to 1.60. The refractive index of the ionizing radiation curing resin, particularly an acrylate or methacrylate resin, is generally 1.45 to 1.55. Therefore, when the refractive index of the fine particles is close to the refractive index of the ionizing radiation curing resin, the anti-dazzling properties can be imparted while maintaining the transparency of the optical laminate.

Specific examples of resin beads having a refractive index close to the ionizing radiation curing resin (the value within parentheses representing refractive index) include polymethylmethacrylate beads (1.49), polycarbonate beads (1.58), polystyrene beads (1.60), polyacryl styrene beads (1.57), and polyvinyl chloride beads (1.54). The particle diameter of these resin beads is preferably 1 to 8 μm. The amount of the resin beads added is 2 to 20 parts by weight, preferably about 16 parts by weight, based on 100 parts by weight of the ionizing radiation curing resin.

In preparing the composition for an anti-dazzling layer, the addition of an anti-settling agent is preferred. The addition of the anti-settling agent can suppress the precipitation of resin beads and can homogeneously disperse the resin beads within a solvent. Specific examples of anti-settling agents include silica beads having a particle diameter of not more than 0.5 μm, preferably about 0.1 to 0.25 μm. The amount of the silica beads as the anti-settling agent added is preferably less than about 0.1 part by weight based on 100 parts by weight of the ionizing radiation curing resin. The addition of the silica beads can effectively prevent settling of the resin beads and, at the same time, can satisfactorily maintain the transparency of the coating film.

3) Light Transparent Base Material

The light transparent base material is preferably smooth and resistant to heat and possesses excellent mechanical strength. Specific examples of the material for light transparent base material formation include thermoplastic resins such as cellulose triacetate, polyester, cellulose diacetate, cellulose acetate butyrate, polyester, polyamide, polyimide, polyether sulfone, polysulfone, polypropylene, polymethylpentene, polyvinyl chloride, polyvinyl acetal, polyether ketone, polymethylmethacrylate, polycarbonate, or polyurethane. Preferred is cellulose triacetate.

In the present invention, the use of the thermoplastic resin in a thin film form which is highly flexible is preferred. Depending upon the form of use where hardness is required, a plate of these thermoplastic resin may also be used.

The thickness of the light transparent base material is not less than 20 μm and not more than 300 μm. Preferably, the upper limit of the thickness of the light transparent base material is 200 μm, and the lower limit of the thickness is 30 μm.

4) Other Layers

The optical laminate according to the present invention basically comprises a light transparent base material and an anti-dazzling layer. Preferably, the following layers may be stacked from the viewpoint of improving optical properties.

Antistatic Layer

The antistatic layer is preferably stacked between the light transparent base material and the anti-dazzling layer. The composition for an antistatic layer comprises an antistatic agent (an electrically conductive agent) and a resin.

Penetrable Solvent

In a preferred embodiment of the present invention, a penetrable solvent for a composition for an antistatic layer is contained. The penetrable solvent may be the same as that explained above in connection with the composition for an anti-dazzling layer. When the penetrating layer is formed of a composition for an antistatic layer and a composition for an anti-dazzling layer, preferably, the amount of the penetrable solvent contained in the composition for an antistatic layer added and the amount of the penetrable solvent contained in the composition for an anti-dazzling layer added are properly regulated.

Antistatic Agent (Electrically Conductive Agent)

Specific examples of antistatic agents usable for antistatic layer formation include quaternary ammonium salts, pyridinium salts, various cationic compounds containing cationic groups such as primary to tertiary amino groups, anionic compounds containing anionic groups such as sulfonic acid bases, sulfuric ester bases, phosphoric ester bases, and phosphonic acid bases, amphoteric compounds such as amino acid and aminosulfuric acid ester compounds, nonionic compounds such as amino alcohol, glycerin, and polyethylene glycol compounds, organometal compounds such as alkoxides of tin and titanium, and metal chelate compounds such as their acetyl acetonate salts. Further, compounds prepared by increasing the molecular weight of the above exemplified compounds may also be mentioned. Furthermore, monomers or oligomers, which contain a tertiary amino group, a quaternary ammonium group, or a metal chelate part and is polymerizable by an ionizing radiation, or polymerizable compounds, for example, organometal compounds such as coupling agents containing a functional group(s) polymerizable by an ionizing radiation may also be used as the antistatic agent.

Specific examples of antistatic agents include electrically conductive ultrafine particles. Specific examples of electrically conductive fine particles include those formed of a metal oxide. Such metal oxides include ZnO (refractive index 1.90; numerical value within the parentheses referred to hereinbelow being a refractive index value), $CeO_2$ (1.95), $Sb_2O_2$ (1.71), $SnO_2$ (1.997), indium tin oxide often abbreviated to ITO (1.95), $In_2O_3$ (2.00), $Al_2O_3$ (1.63), antimony doped tin oxide (abbreviation; ATO, 2.0), and aluminum doped zinc oxide (abbreviation; AZO, 2.0). Fine particles refer to particles having a size of not more than 1 micron, that is, the so-called submicron size, preferably having an average particle diameter of 0.1 nm to 0.1 μm.

3) Resin

The resin may be the same as that described above in connection with the composition for an anti-dazzling layer.

Hardcoat Layer

The hardcoat layer is preferably stacked between the light transparent base material and the anti-dazzling layer. The composition for a hardcoat layer comprises a resin. In the present invention, preferably, the composition for a hardcoat layer further comprises an electrically conductive agent. The term "hardcoat layer" as used herein refers to a coat layer having a hardness of "H" or more in a pencil hardness test specified in JIS 5600-5-4:1999. The thickness (on a cured state basis) of the hardcoat layer is in the range of 0.1 to 100 μm, preferably in the range of 0.8 to 20 μm.

Penetrable Solvent

In a preferred embodiment according to the present invention, the composition for a hardcoat layer comprises a penetrable solvent. The penetrable solvent may be the same as that described above in connection with the composition for an anti-dazzling layer. When the penetrating layer is formed of a composition for a hardcoat layer and a composition for an anti-dazzling layer, preferably, the amount of the penetrable solvent contained in the composition for a hardcoat layer added and the amount of the penetrable solvent contained in the composition for an anti-dazzling layer added are properly regulated.

Resin

The resin is preferably transparent, and specific examples thereof include three types of resins curable upon exposure to ultraviolet light or electron beams, that is, ionizing radiation curing resins, mixtures of ionizing radiation curing resins and solvent drying-type resins, and heat curing resins. Preferred are ionizing radiation curing resins.

Specific examples of ionizing radiation curing resins include acrylate functional group-containing resins, for example, relatively low-molecular weight polyester resins, polyether resins, acrylic resins, epoxy resins, urethane resins, alkyd resins, spiroacetal resins, polybutadiene resins, polythiolpolyene resins, oligomers or prepolymers of (meth)acrylates or the like of polyfunctional compounds such as polyhydric alcohols, and reactive diluents. Specific examples thereof include monofunctional monomers and polyfunctional monomers such as ethyl (meth)acrylate, ethylhexyl (meth)acrylate, styrene, methylstyrene, N-vinylpyrrolidone, for example, polymethylolpropane tri(meth)acrylate, hexanediol (meth)acrylate, tripropylene glycol di(meth)acrylate, diethylene glycol di(meth)acrylate, pentaerithritol tri(meth)acrylate, dipentaerithritol hexa(meth)acrylate, 1,6-hexanediol di(meth)acrylate, and neopentyl glycol di(meth)acrylate.

When an ionizing radiation curing resin is used as the ultraviolet curing resin, the use of a photopolymerization initiator is preferred. Specific examples of photopolymerization initiators include acetophenones, benzophenones, Michler's benzoyl benzoate, α-amyloxime ester, tetramethylthiuram monosulfide, and thioxanthones. Further, a photosensitizer is preferably mixed in the resin, and specific examples thereof include n-butylamine, triethylamine, poly-n-butylphosphine.

The solvent drying-type resin mixed into the ionizing radiation curing resin is mainly a thermoplastic resin. Generally exemplified thermoplastic resins may be used. The occurrence of coating film defects in the coating surface can be effectively prevented by adding the solvent drying-type resin. In a preferred embodiment of the present invention, when the material for the transparent base material is a cellulosic resin such as TAC, specific examples of preferred thermoplastic resins include cellulosic resins, for example, nitrocellulose resins, acetyl cellulose resins, cellulose acetate propionate resins, and ethylhydroxyethylcellulose resins.

Specific examples of heat curing resins include phenolic resins, urea resins, diallyl phthalate resins, melanin resins, guanamine resins, unsaturated polyester resins, polyurethane resins, epoxy resins, aminoalkyd resins, melamine-urea co-condensation resins silicone resins, and polysiloxane resins. When heat curing resins are used, if necessary, curing agents such as crosslinking agents and polymerization initiators, polymerization accelerators, solvents, viscosity modifiers and the like may also be added.

Optional Components

Polymerization Initiator

A photopolymerization initiator may be used in forming a hardcoat layer. Specific examples thereof include 1-hydroxy-cyclohexyl-phenyl-ketone. This compound is commercially available, for example, under the tradename Irgacure 184 (manufactured by Ciba Specialty Chemicals, K.K.).

Antistatic Agent and/or Anti-dazzling Agent

The hardcoat layer preferably comprises an antistatic agent and/or an anti-dazzling agent. The antistatic agent may be the same as that described above in connection with the composition for an anti-dazzling layer. The anti-dazzling agent may be the same as that described above in connection with the composition for an anti-dazzling layer.

Lower-refractive Index Layer

In the present invention, a lower-refractive index layer is preferably stacked. Specifically, the formation of the lower-refractive index layer on the anti-dazzling layer is preferred. The lower-refractive index layer may be formed of a thin film comprising a silica- or magnesium fluoride-containing resin, a fluororesin as a lower-refractive index resin, or a silica- or magnesium fluoride-containing fluororesin and having a refractive index of not more than 1.46 and a thickness of about 30 nm to 1 μm, or a thin film formed by chemical deposition or physical deposition of silica or magnesium fluoride. Resins other than the fluororesin are the same as used for constituting the antistatic layer.

More preferably, the lower-refractive index layer is formed of a silicone-containing vinylidene fluoride copolymer. Specifically, this silicone-containing vinylidene fluoride copolymer comprises a resin composition comprising 100 parts of a fluorocopolymer prepared by copolymerization using, as a starting material, a monomer composition containing 30 to 90% (all the percentages being by mass; the same shall apply hereinafter) of vinylidene fluoride and 5 to 50% of hexafluoropropylene, and having a fluorine content of 60 to 70% and 80 to 150 parts of an ethylenically unsaturated group-containing polymerizable compound. This resin composition is used to form a lower-refractive index layer having a refractive index of less than 1.60 (preferably not more than 1.46) which is a thin film having a thickness of not more than 200 nm and to which scratch resistance has been imparted.

For the silicone-containing vinylidene fluoride copolymer constituting the lower-refractive index layer, the content of individual components in the monomer composition is 30 to 90%, preferably 40 to 80%, particularly preferably 40 to 70%, for vinylidene fluoride, and 5 to 50%, preferably 10 to 50%, particularly preferably 15 to 45%, for hexafluoropropylene.

This monomer composition may further comprise 0 to 40%, preferably 0 to 35%, particularly preferably 10 to 30%, of tetrafluoroethylene.

The above monomer composition may comprise other comonomer component in such an amount that is not detrimental to the purpose of use and effect of the silicone-containing vinylidene fluoride copolymer, for example, in an amount of not more than 20%, preferably not more than 10%. Specific examples of other comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and α-trifluoromethacrylic acid.

The fluorocopolymer produced from this monomer composition should have a fluorine content of 60 to 70%, preferably 62 to 70%, particularly preferably 64 to 68%. When the fluorine content is in the above-defined specific range, the fluoropolymer has good solubility in solvents. The incorporation of the above fluoropolymer as a component can result in the formation of a thin film which has excellent adhesion to various base materials, has a high level of transparency and a low level of refractive index and, at the same time, has satisfactorily high mechanical strength. Therefore, the surface with the thin film formed thereon has a satisfactorily high level of mechanical properties such as scratch resistance which is very advantageous.

Preferably, the molecular weight of the fluorocopolymer is 5,000 to 200,000, particularly preferably 10,000 to 100,000, in terms of number average molecular weight as determined using polystyrene as a standard. When the fluorocopolymer having this molecular weight is used, the fluororesin composition has suitable viscosity and thus reliably has suitable coatability. The refractive index of the fluorocopolymer per se is preferably not more than 1.45, particularly preferably not more than 1.42, still more preferably not more than 1.40. When a fluorocopolymer having a refractive index exceeding 1.45 is used, in some cases, the thin film formed from the resultant fluorocoating composition has a low level of antireflection effect.

The lower-refractive index layer may also be formed of a thin film of $SiO_2$. This lower-refractive index layer may be formed, for example, by vapor deposition, sputtering, or plasma CVD, or by a method in which an $SiO_2$ gel film is formed from a sol liquid containing an $SiO_2$ sol. In addition to $SiO_2$, a thin film of $MgF_2$ or other material may constitute the lower-refractive index layer. However, the use of a thin film of $SiO_2$ is preferred from the viewpoint of high adhesion to the lower layer. Among the above methods, when plasma CVD is adopted, a method is preferably adopted in which an organosiloxane is used as a starting gas and the CVD is carried out in such a state that other inorganic vapor deposition sources are not present. Further, preferably, in the CVD, the substrate is kept at the lowest possible temperature.

Higher-refractive Index Layer/Medium-refractive Index Layer

In a preferred embodiment of the present invention, other refractive index layers (a higher-refractive index layer and a medium-refractive index layer) may be provided to further improve the antireflection properties. Preferably, these layers may be provided between the anti-dazzling layer and the lower-refractive index layer. The refractive index of these refractive index layers may be set to a range of 1.46 to 2.00. Further, in the present invention, the medium-refractive index layer refers to a layer having a refractive index in the range of 1.46 to 1.80. The higher refractive index layer refers to a layer having a refractive index in the range of 1.65 to 2.00.

These refractive index layers may be formed of an ionizing radiation curing resin and ultrafine particles having a particle diameter of not more than 100 nm and a predetermined refractive index. Specific examples of such fine particles (the value within the parentheses representing the refractive index) include zinc oxide (1.90), titania (2.3 to 2.7), ceria (1.95), tin-doped indium oxide (1.95), antimony-doped tin oxide (1.80), yttria (1.87), and zirconia (2.0).

The refractive index of the ultrafine particles is preferably higher than that of the ionizing radiation curing resin. In general, the refractive index of the refractive index layer is determined by the content of the ultrafine particles. Therefore, the larger the amount of the ultrafine particles added, the higher the refractive index of the refractive index layer. For this reason, the refractive index was brought to a range of 1.46 to 1.80 by regulating the addition ratio of the ionizing radiation curing resin and the ultrafine particles. The formation of the higher-refractive index layer or the medium-refractive index layer is possible.

When the ultrafine particles are electrically conductive, other refractive index layer (a higher-refractive index layer or a medium-refractive index layer) formed of such ultrafine particles has antistatic properties.

The higher-refractive index layer or medium-refractive index layer may be in the form of a vapor-deposited film of an inorganic oxide having a high refractive index such as titanium oxide or zirconium oxide formed by vapor deposition such as chemical vapor deposition (CVD) or physical vapor deposition (PVD), or alternatively may be in the form of a coating film with inorganic oxide fine particles having a high refractive index such as titanium oxide dispersed therein.

Anti-fouling Layer

In a preferred embodiment of the present invention, an anti-fouling layer may be provided for preventing fouling of the outermost surface of the lower-refractive index layer. Preferably, the anti-fouling layer is provided on the surface of the light transparent base material remote from the lower-refractive index layer. The anti-fouling layer can further improve anti-fouling properties and scratch resistance of the antireflective laminate.

Specific examples of agents for the anti-fouling layer include fluorocompounds and/or silicon compounds, which have low compatibility with an ionizing radiation curing resin composition having a fluorine atom in its molecule and cannot be incorporated into the lower-refractive index layer without difficulties, and fluorocompounds and/or silicon compounds which are compatible with an ionizing radiation curing resin composition having a fluorine atom in its molecule and fine particles.

2. Production Process of Optical Laminate

Preparation of Liquid Composition for Each Layer

The composition for each layer, for example, for the anti-dazzling layer, the lower-refractive index layer and the like may be prepared according to a conventional preparation method by mixing the above-described components together and subjecting the mixture to dispersion treatment. The mixing and dispersion can be properly carried out, for example, by a paint shaker or a beads mill.

Coating

Specific examples of methods for coating each liquid composition onto a surface of the light transparent base material and a surface of the antistatic layer include various methods such as dip coating, air knife coating, curtain coating, roll coating, wire bar coating, gravure coating, extrusion coating, microgravure coating, roll coating, extrusion method, spin coating, spraying, slide coating, bar coating, meniscus coating, flexographic printing, screen printing, and bead coating.

Curing

The resin constituting each layer may be cured by a well-known method. For example, in the case of electron beam curing resins, electron beams having an energy of 50 to 1000 KeV, preferably 100 to 300 KeV, emitted from various electron beam accelerators, such as Cockcroft-Walton accelerators, van de Graaff accelerators, resonance transformers, insulated core transformers, linear, dynamitron, and high-frequency electron accelerators may be used. On the other hand, in the case of curing by ultraviolet light, for example, ultraviolet light generated from light sources such as ultra-high pressure mercury lamps, high pressure mercury lamps, low pressure mercury lamps, carbon arc lamps, xenon arc lamps, and metal halide lamps may be used.

3. Use of Optical Laminate

The optical laminate according to the present invention is preferably utilized as antireflective laminates. Further, the optical laminate according to the present invention can be utilized as a laminate for the outermost surface of polarizing plates and displays of transmission display devices. In particular, the optical laminate according to the present invention is used for display in televisions, computers, word processors and the like, especially on display surfaces, for example, in CRTs or liquid crystal panels.

Polarizing Plate

A polarizing plate is composed mainly of a polarizing film and two protective laminates holding the polarizing film from respective both sides thereof. Preferably, the antireflection laminate according to the present invention is used in at least one of the two protective laminates holding the polarizing film from both sides thereof. When the optical laminate according to the present invention functions also as the protective laminate, the production cost of the polarizing plate can be reduced. The use of the optical laminate according to the present invention as the outermost layer can provide a polarizing plate that can prevent external light reflection and the like and, at the same time, is also excellent in scratch resistance, anti-fouling properties and the like. The polarizing film may be a conventional polarizing film or a polarizing film taken off from a continuous polarizing film of which the absorption axis of the polarizing film is neither parallel nor perpendicular to the longitudinal axis.

EXAMPLES

The present invention will be described in more detail with reference to the following Examples. However, it should be noted that the contents of the present invention should not be construed as limited to the contents of the following Examples. Numerical values are by mass (kg) unless otherwise specified.

Light Transparent Base Material

A cellulose triacetate film (tradename: T 80 UZ, manufactured by Fuji Photo Film Co., Ltd.) was provided.

Preparation of Composition for Anti-dazzling Layer

Compositions for an anti-dazzling layer were prepared by mixing according to formulations shown in Table 1 below.

TABLE 1

| | |
|---|---|
| Polystyrene beads (SX-350 H, manufactured by Soken Chemical Engineering Co., Ltd.) | 16.0 |
| Pentaerythritol acrylate (manufactured by Nippon Kayaku Co., Ltd.) | 94.0 |

TABLE 1-continued

| | |
|---|---|
| Dipentaerythritol pentaacrylate (manufactured by Nippon Kayaku Co., Ltd.) | 5.0 |
| Acrylic polymer (manufactured by The Inctec Inc.) | 10.0 |
| Irgacure 184 (polymerization initiator, manufactured by Ciba-Geigy Limited) | 6.6 |
| Irgacure 907 (polymerization initiator, manufactured by Ciba-Geigy Limited) | 1.1 |
| Silicone 10-28 (solid content 10%, manufactured by Dainichiseika Color & Chemicals Mfg. Co., Ltd.) | 0.59 |
| Gold- and nickel-plated organic beads (Bright 20 GNR-4.6 EH) | 0.15 |
| Solvent 1: toluene | 116 |
| Solvent 2: cyclohexanone | 67 |
| P/V ratio | 16% |
| Solid content | 37.5% |

Preparation of Compositions for Antistatic Layer

Compositions 1 to 3 for an antistatic layer were prepared by mixing according to formulations shown in Table 2 below.

TABLE 2

| | Composition 1 | Composition 2 | Composition 3 |
|---|---|---|---|
| ATO particles (ATO: antimony-doped tin oxide) | 0.725 | 0.725 | 0.725 |
| Urethane acrylate | 0.375 | 0.375 | 0.375 |
| Ethyl cellosolve (PELTRON C-4456 S-7, manufactured by NIPPON PELNOX CORP.) | 1.375 | 1.375 | 1.375 |
| KS-HDDA (manufactured by Nippon Kayaku Co., Ltd.) | 1.53 | 0.65 | 0.65 |
| Irgacure 184 (manufactured by Ciba-Geigy Limited) | 0.084 | 0.084 | 0.084 |
| Solvent 1: methyl ethyl ketone | 6.1 | 6.1 | 5.9 |
| Solvent 2: cyclohexanone | 2.4 | 2.4 | 2.6 |
| P/V ratio, % (weight ratio based on amount of resin) | 36.4 | 66.9 | 66.9 |
| Solid content, % | 21.5 | 15.7 | 15.7 |

Example 1

Composition 1 for an antistatic layer was coated by a Mayer bar onto one side of a cellulose triacetate film (thickness 80 μm). The coated film was held in a hot oven at a temperature of 50° C. for one min. Ultraviolet light was then applied at an integrated quantity of light of 35 mj-35 mj to the dried film to cure the coating film to form an antistatic layer (coverage 1.0 g/cm$^2$ on a dry basis). Next, the composition for an anti-dazzling layer was coated by a Mayer bar onto the antistatic layer and was held in a hot oven at a temperature of 50° C. for one min. Thereafter, ultraviolet light was applied to the dried film at an integrated quantity of light of 12 mj-35 mj to cure the coating film. Thus, an anti-dazzling layer (coverage 7.0 g/cm$^2$ on a dry basis) was formed to prepare an optical laminate (an antistatic anti-dazzling laminate).

Comparative Example 1

An optical laminate was prepared in the same manner as in Example 1, except that the composition 1 for an antistatic layer was changed to a composition 2 for an antistatic layer.

Comparative Example 2

An optical laminate was prepared in the same manner as in Example 1, except that the composition 1 for an antistatic layer was changed to a composition 3 for an antistatic layer.

Comparative Example 3

An optical laminate was prepared in the same manner as in Example 1, except that the composition 1 for an antistatic layer was not formed.

Evaluation Test

For the optical laminates prepared in the above Examples, the following evaluation tests were carried out. The results are shown in Table 3 below.

1: Total Light Transmittance

The total light transmittance (%) was measured with a haze meter (product number; HR-100, manufactured by Murakami Color Research Laboratory).

2: Haze Value

The haze value (%) was measured with a haze meter (product number; HR-100, manufactured by Murakami Color Research Laboratory).

3: 60-Degree Loss

The 60-degree gloss was measured with a gloss meter (product number; GM-26 D, manufactured by Murakami Color Research Laboratory).

4: Surface Resistivity

The surface resistivity (Ω/□) was measured with a surface resistivity measuring device (product number; Hiresta HCT-HT 450, manufactured by Mitsubishi Chemical Corporation).

5: Reflection

A cross Nicol polarizing plate was laminated onto the optical laminate, and fluorescent light was applied. The reflection from the assembly was visually observed. The results were evaluated according to the following criteria.

Evaluation Criteria

⊚: Reflection of fluorescent light was not substantially observed.

○: Reflection of fluorescent light was slightly observed on such a level that poses no problem of optical properties.

Δ: Reflection of fluorescent light was observed on such a level that poses no problem as an optical laminate product.

6: Scintillation

A color filter was put on backlight, and glass was applied to the backside of the optical laminate. The assembly was put on the color filter and was visually inspected. The results were evaluated according to the following criteria.

Evaluation Criteria

⊚: Scintillation was not substantially observed.

○: Scintillation was slightly observed on such a level that poses no problem of optical properties.

Δ: Reflection of fluorescent light was slightly observed on such a level that poses no problem as an optical laminate product.

7: Surface Roughness

For the outermost surface (planar area of 5 μm$^2$) of the optical laminate, the surface roughness (Sm) and the arithmetical average roughness (Ra) were measured according to measurement reference specified in JIS B 0601-1994 with a surface roughness measuring instrument SE-3400 (Kosaka Laboratory Ltd.).

TABLE 3

| Evaluation | | Ex. 1 | Comp. Ex. 1 | Comp. Ex. 2 | Comp. Ex. 3 |
|---|---|---|---|---|---|
| Evaluation 1 | | 89.6 | 89.6 | 89.6 | 90.8 |
| Evaluation 2 | | 37 | 37 | 37 | 34 |
| Evaluation 3 | | 40 | 28 | 33 | 50 |
| Evaluation 4 | ($\times 10^8$) | 1.0 | 1.0 | 1.0 | 1.0 |
| Evaluation 5 | | ◎ | ○ | ○ | △ |
| Evaluation 6 | | ◎ | △ | △ | ○ |
| Evaluation 7 | (Sm) | 71 | 101 | 91 | 56 |
| | (Ra) | 0.23 | 0.31 | 0.28 | 0.18 |

The invention claimed is:

1. An antireflective laminate comprising:
    a light transparent base material; and
    an anti-dazzling layer provided on said light transparent base material,
    wherein said anti-dazzling layer is formed by applying a composition for an anti-dazzling layer onto said light transparent base material, said composition for said anti-dazzling layer including an anti-dazzling agent comprising fine particles having particle diameters of 1 to 8 μm,
    wherein a penetrable solvent and a resin contained in said composition for said anti-dazzling layer penetrate into said light transparent base material so that said resin and said light transparent base material are blended together to form a penetrating layer,
    wherein a thickness of said light transparent base material is not less than 20 μm and not more than 300 μm, and
    wherein a thickness of said anti-dazzling layer is not less than 0.1 μm and not more than 100 μm.

2. The antireflective laminate according to claim 1, wherein a thickness of said penetrating layer is not less than 0.1 μm and not more than 1.5 μm.

3. The antireflective laminate according to claim 1, wherein said penetrable solvent is one solvent or a mixture of two or more solvents selected from the group consisting of acetone, ketone, methyl ethyl ketone, cyclohexanone, tetrahydrofuran, nitromethane, 1,4-dioxane, dioxolane, N-methylpyrrolidone, ethyl acetate, methyl acetate, butyl acetate, dichloromethane, trichloromethane, trichloroethylene, ethylene chloride, trichloroethane, tetrachloroethane, N,N-dimethylformamide, and chloroform.

4. The antireflective laminate according to claim 1, wherein said light transparent base material is cellulose triacetate.

5. A polarizing plate comprising a polarizing element and an antireflective laminate according to claim 1.

6. The antireflective laminate according to claim 1, which is utilized as an image display device.

7. The antireflective laminate according to claim 1, wherein said fine particles of said anti-dazzling agent comprise resin beads.

8. An antireflective laminate comprising:
    a light transparent base material; and
    an antistatic layer and an anti-dazzling layer provided in that order on said light transparent base material,
    wherein said anti-dazzling layer is formed by applying a composition for an anti-dazzling layer onto said antistatic layer, said composition for said anti-dazzling layer including an anti-dazzling agent comprising fine particles having particle diameters of 1 to 8 μm,
    wherein a penetrable solvent and a resin contained in said composition for said anti-dazzling layer penetrate into said light transparent base material so that said resin and said light transparent base material are blended together to form a penetrating layer,
    wherein a thickness of said light transparent base material is not less than 20 μm and not more than 300 μm, and
    wherein a thickness of said anti-dazzling layer is not less than 0.1 μm and not more than 100 μm.

9. The antireflective laminate according to claim 8, wherein
    said antistatic layer is formed by applying a composition for an antistatic layer onto said light transparent base material, and
    a penetrable solvent and a resin contained in said composition for said antistatic layer and said penetrable solvent and said resin contained in said composition for said anti-dazzling layer penetrate into said light transparent base material, so that said resin contained in said composition for an antistatic layer, said resin contained in said composition for an anti-dazzling layer, and said light transparent base material are perfectly uniformly blended together to form a penetrating layer.

10. The antireflective laminate according to claim 8, wherein said fine particles of said anti-dazzling agent comprise resin beads.

11. An antireflective laminate comprising:
    a light transparent base material; and
    a hardcoat layer and an anti-dazzling layer provided in that order on said light transparent base material,
    wherein said anti-dazzling layer is formed by applying a composition for an anti-dazzling layer onto said hardcoat layer, said composition for said anti-dazzling layer including an anti-dazzling agent comprising fine particles having particle diameters of 1 to 8 μm,
    wherein a penetrable solvent and a resin contained in said composition for said anti-dazzling layer penetrate into said light transparent base material so that said resin and said light transparent base material are blended together to form a penetrating layer,
    wherein a thickness of said light transparent base material is not less than 20 μm and not more than 300 μm, and
    wherein a thickness of said anti-dazzling layer is not less than 0.1 μm and not more than 100 μm.

12. The antireflective laminate according to claim 11, wherein
    said hardcoat layer is formed by applying a composition for a hardcoat layer onto said light transparent base material,
    a penetrable solvent and a resin contained in said composition for said hardcoat layer and said penetrable solvent and said resin contained in said composition for said anti-dazzling layer penetrate into said light transparent base material, so that said resin contained in said composition for said hardcoat layer, said resin contained in said composition for an anti-dazzling layer and said light transparent base material are perfectly uniformly blended together to form a penetrating layer.

13. The antireflective laminate according to claim 12, wherein said hardcoat layer comprises an electrically conductive agent and/or an anti-dazzling agent.

14. The antireflective laminate according to claim 11, wherein said fine particles of said anti-dazzling agent comprise resin beads.

* * * * *